United States Patent [19]

Segawa

[11] 4,299,318
[45] Nov. 10, 1981

[54] UNIT HUB FOR BICYCLES

[75] Inventor: Takashi Segawa, Sakai, Japan

[73] Assignee: Shimano Industrial Company Limited, Osaka, Japan

[21] Appl. No.: 14,097

[22] Filed: Feb. 22, 1979

Related U.S. Application Data

[63] Continuation of Ser. No. 763,146, Nov. 18, 1976, abandoned.

[30] Foreign Application Priority Data

Dec. 2, 1975 [JP] Japan ................................. 50-164605

[51] Int. Cl.³ ....................... F16D 23/00; F16D 41/04
[52] U.S. Cl. ..................................... 192/64; 308/192; 474/160; 474/158
[58] Field of Search .......... 74/243 DR, 217 B, 243 R, 74/245 R; 192/6 A, 64; 280/289; 29/159.3; 81/71; 308/192

[56] References Cited

U.S. PATENT DOCUMENTS

| 791,548 | 6/1905 | Fischer | 81/71 |
|---|---|---|---|
| 2,489,934 | 11/1949 | Schwinn | 192/64 |
| 2,538,350 | 1/1951 | Baule | 81/71 |
| 3,081,641 | 3/1963 | Iseman | 192/6 A |
| 3,554,340 | 1/1971 | Shimano et al. | 192/64 |
| 3,900,088 | 8/1975 | Ozaki | 74/217 B |
| 3,972,245 | 8/1976 | Allen | 192/64 |

FOREIGN PATENT DOCUMENTS

| 441602 | 1/1936 | United Kingdom | 192/64 |
|---|---|---|---|
| 584472 | 1/1947 | United Kingdom | 192/6 A |

Primary Examiner—C. J. Husar
Assistant Examiner—Moshe I. Cohen
Attorney, Agent, or Firm—Stevens, Davis, Miller & Mosher

[57] ABSTRACT

A unit hub for a bicycle, comprising a hub combined with a freewheel. A cylindrical member is screwed to the hub body and is provided at one of its axially outside ends with an extension radially extending and having ball races carrying balls for supporting therewith a driving member and supporting the cylindrical member to the hub shaft respectively. The cylindrical member has a rotary control or tool receiving opening formed within the center thereof.

2 Claims, 3 Drawing Figures

UNIT HUB FOR BICYCLES

This is a Continuation of application Ser. No. 743,146 filed Nov. 18, 1976 now abandoned.

This invention relates to a unit hub for a bicycle, comprising the hub combined with a freewheel.

Figure 3:
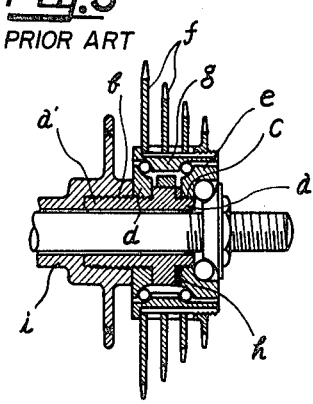

Generally, this kind of unit hub is so contructed that a cylindrical member a is, as shown in FIG. 3, is provided at its axial ends with outer screw threads b and c, on which are screwed bearings d and e through which a driving member g carrying a plurality of sprockets are unidirectionally rotatably supported. An adjuster h is inserted between the bearing e at the outside (right side in FIG. 3) and substantially the middle portion of cylindrical member a, and also the cylindrical member a is extended at its axially one end to form an extension a' having an outer screw thread screwed to an inner screw thread formed at one end of a hub body i.

The unit hub, which is required to be wholly dismantled for cleaning or adjusting the sprocket free rotation through adjusting bearings d and e has the extension a' clockwise reversibly threaded to the rear wheel forward rotation, to be self tightening so that the extension a' may not come out of the hub body i. While, the right side of cylindrical member a is counter clockwise threaded to allow sprocket free rotation. Hence, there are many problems in that the unit hub is dismantled in a manner that the outside bearing e is rotatably controlled to rotate the cylindrical member a thereby removing the extension a' from the hub body i, but the cylindrical member a, which is tightly screwed with the latter by the bicycle's running, is not easily turnable even with the bearing e rotation thereby making difficult the removal of the same. Also the cylindrical member a becomes turnable the first time that the bearing e is screwed thereto by a strength equal to or more than the force/screwing the cylindrical member to the hub body i so that the adjuster h is subject to/for intensive stress and may be damaged thereby making it impossible to adjust the sprockets in free rotation. Furthermore, the bearing d in contact with axially one end of the hub body i is screwably tightened following the extension a' being screwably tightened to the hub body i by the rotation of cylindrical member a through normal rotation of the driving member g, resulting in unsmooth free rotation of the hub body i.

The invention has been designed to solve the above problems. A main object of the invention is to provide of a unit hub, in which the cylindrical member can easily be assembled with or dismantled from the hub body, especially after use for some time. Further the adjuster is prevented from being damaged in the dismantling. The cylindrical member screwably tightened to the hub body exerts no influence upon the bearing carrying the driving member, thereby making always smooth the hub body free rotation.

The invention is characterised in that at the cylindrical member screwed to axially one/of the hub body are integrally formed a pair of bearings carrying therewith the driving member and at axially outside one end of the cylindrical end member is formed a rotary control for rotatably controlling the cylindrical member. Hence, the unit hub is adapted to easily remove the cylindrical member from the hub body by rotatably controlling the rotary control by means of a jig engaged therewith, and without any stress applied, in the dismantling, to the adjuster regulating the sprocket free rotation.

Furthermore, the invention is directed to form two screw threads i.e. a first and a second thread, which first thread is formed at axially one end or at the hub body side of the cylindrical member and is screwable with the inner thread of the hub body and which second thread is formed outward adjacent to the first thread so as to be screwable to one of the bearings. The second thread is larger in outer diameter than the first thread so that the shoulder bordering both of the threads may be abutted against the end face of the hub body for keeping in regular position the one of bearings screwable to the second thread, without being screwably tightened even though the cylindrical member is tightened into the hub body in the bicycle's running. Thus always smooth free rotation of the hub body is carried out.

Figure 1:
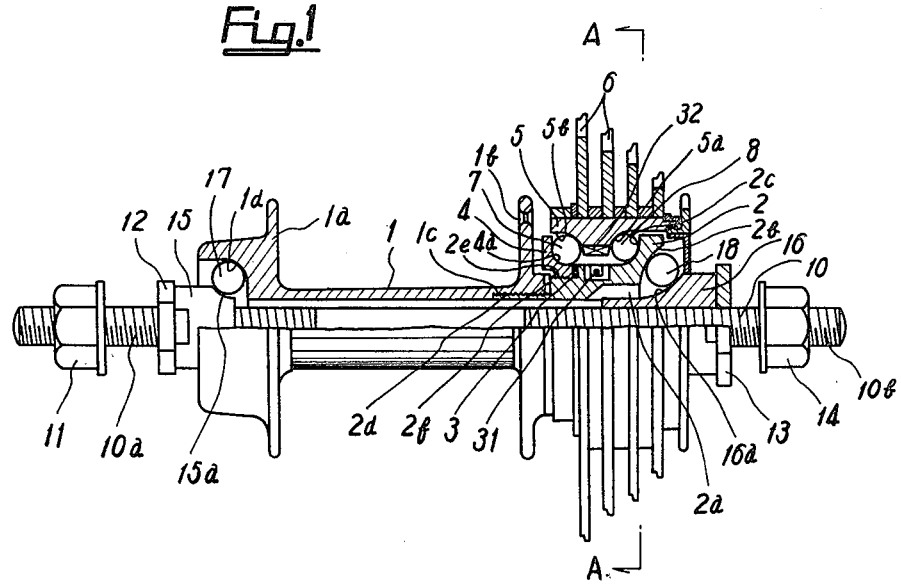
Figure 2:
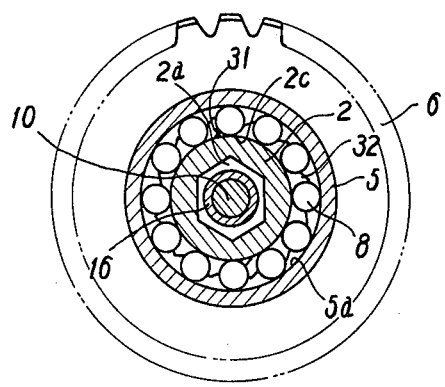

The aforesaid objects and others will be apparent from the following description of the principal construction in accordance with the accompanying drawings, in which FIG. 1 is a partially cutway front view showing the unit hub of an embodiment of the invention, FIG. 2 is a sectional view taken on Line A—A in FIG. 1, and FIG. 3 is a longitudinally sectional view of the conventional unit hub.

In FIGS. 1 and 2 the reference numeral 1 denotes a hub body provided at its axially ends of the outer periphery with flanges 1a and 1b, extending radially outward of the hub body 1, each of the flanges 1a and 1b being attached to a plurality of spokes (not shown) of the bicycle. Flange 1b is provided at its inner surface with a screw thread 1c while flange 1a is provided with a ball race 1d.

The reference numeral 10 denotes a hub shaft rotatably supporting the hub body 1. The hub shaft 10 has at both its ends screw threads 10a and 10b and is fixed to the bicycle frame (not shown) through nuts 11 and 12 and 14 and 13 respectively.

The reference numeral 2 denotes a cylindrical member screwable with screw thread 1c. The cylindrical member 2 as a whole is formed into a cylinder-like shape and has at an axially outward end an annular extension extending radially outward of the cylindrical member.

The extension corresponds to the bearing e of the conventional embodiment in FIG. 3 and is formed in one piece with the cylindrical member 2 and has ball races 2b and 2c at the axially outer and inner surfaces of the extension. At the axially lateral side of the extension is provided a rotary control for rotatably controlling the cylindrical member 2.

The rotary control 2a shown in FIGS. 1 and 2 is formed as a hexagonal bore greater in diameter than the center bore of the cylindrical member so that a jig may be inserted into the bore from outside of the extension. Other than being formed at the center bore, the rotary control 2a may be formed in a radially extending groove insertably engageable with the jig.

The cylindrical portion extending most axially inwardly (leftward in FIG. 1) of the cylindrical member 2 is provided at the outer periphery of the portion with a first screw thread 2d screwable with the thread 1c of hub body 1 and with a second screw thread 2e positioned axially outward (rightward in FIG. 1) of the first screw thread 2d. The cylindrical member 2 has on its outer periphery axially outward (rightward in FIG. 1) adjacent to the second thread 2e pawls 31 of a unidirectionally rotary transmission to be hereinafter described.

The second thread 2e has its major diameter greater than the first thread 2d and at the border of both of the threads 2d and 2e is a radially extending shoulder 2f being abutted against by one end face of the hub body 1 when the first thread 2d is screwed into the inner thread 1c of the hub body 1.

The reference numeral 4 denotes a bearing screwable to the second thread 2e. At the inner periphery of the bearing 4 there is provided a screw thread screwable with the second thread 2e and at the outer periphery a ball race 4a. An adjuster 3 of a ring-like shape, as shown in FIG. 1, is inserted between the cylindrical member 2 and the bearing 4 by being screwed on the second thread 2e.

The reference numeral 5 denotes a cylindrical driving member. The driving member 5 carries at its outer periphery sprockets 6 of different diameters, and has axially at both of the inner periphery an outer ball race 5a opposite to the inner ball race 2c of the cylindrical member 2 and an outer ball rach 5b opposite to the inner ball race 4a of the bearing 4. Between both the ball races 5a and 5b are ratchet teeth 32 building up together with the pawls 31 the unidirectionally rotary transmission.

The driving member 5 accommodates balls 7 and 8 between the opposite ball races 4a and 5b and between the opposite ball races 2c and 5a respectively, and is rotatably supported onto the outer periphery of the cylindrical member 2 through the balls 7 and 8, so that the unidirectionally rotary transmission composed of the pawls 31 and ratchet teeth 32 may, in normal rotation of the driving member 5, convey the driving force from the driving member 5 to the cylindrical member 2, thereby forcibly driving the hub body 1, while, being rotatably free when the driving member 5 is reversibly rotated or the hub body 1 is normally rotated with respect to the driving member 5.

In addition, the hub body 1 is supported to a hub shaft 10 through ball holders 15 and 16 having ball races 15a and 16a and balls 17 and 18 carried with the ball races 15a and 16a respectively.

In detail, the hub body 1 is rotatably support axially at one end (the left side in FIG. 1) to the hub shaft 10 through the balls 17 which are inserted between the ball race 1d formed at the radially inner surface of the flange 1a and the ball race 15a of the ball holder 15 screwed onto the hub shaft 10, and at the other end (the right side in FIG. 1) through balls 18 which are inserted between the ball race 2b formed axially outward of the annular extension of the cylindrical member 2 and the ball race 16a of the ball holder 16 screwed onto the hub shaft 10.

The aforesaid unit hub of the invention is assembled in such a manner that, first, the driving member 5 is mounted through balls 7 and 8 onto the outer periphery of cylindrical member 2 in rotatable relation therewith, the cylindrical member 2 then is screwably mounted to the hub body 1 through the inner thread 1c thereof by rotating the rotary control 2a by use of the jig insertably engaged therewith, and then the balls 18 are placed on the ball race 2b of cylindrical member 2 and held with the ball holder 16 screwed with the hub shaft 10. On the other hand, the unit hub is dismantled in the reverse order to the above, such that the ball holder 16 is first removed from the hub shaft 10, and the cylindrical member 2 is loosened through the rotary control 2a with the jig inserted therein and removed from the hub body 1 as the cylindrical member carries the sprockets therewith. At this time, the adjuster 3 inserted between the cylindrical member 2 and the bearing 4 is not subject to any stress caused by the rotation of the cylindrical member 2, thereby completely preventing the adjuster 3 from being damaged.

As clearly understood from the abovementioned description, the unit has the advantages that the rotation of the cylindrical member through the rotary control rotatable by means of the jig insertably engaged therewith allows the cylindrical member to be simply mounted to or dismounted from the hub shaft, thereby making vary convenient the assembly and dismantling of the unit hub. Further, there is no fear that the adjuster as conventionally is subject to intensive stress to lead to the damage thereof when the cylindrical member is dismounted, as a result, the adjuster is re-useable even after dismantling for cleaning.

Furthermore, since the cylindrical member allows its shoulder formed between both the first and second threads to be abutted against the end face of the hub body, the bearing screwed with the second thread of the cylindrical member is not screwably tightened even when the cylindrical member is screwably tightened to the hub body by the driving force conveyed from the driving member, thereby keeping constant the free rotational function adjustable by means of the adjuster. Hence, the unit hub is always smoothly rotatable in free.

While an embodiment of the invention has been shown and described, the invention is not limited to the specific construction thereof, which is merely exemplified in the specification rather than defined.

What is claimed is:

1. A unit hub for a bicycle, comprising:
    (a) a threaded hub shaft securable to a bicycle frame;
    (b) a hub body rotatably supported on the outer periphery of said hub shaft, said hub body having on the inside of one axial end thereof a ball race and on the inside of the other end thereof a screw thread;
    (c) a cylindrical member screwed to said thread of the hub body, said cylindrical member having an axially external portion radially outward extending to define an extension, said extension having ball races at axially outer and inner surfaces thereof; a rotary control opening within the center of said cylindrical member; said cylindrical member having a cylindrical shape at its axially inward portion, said cylindrical portion having at its inner end a first screw thread in mesh with said thread of the hub body and a second screw thread on the outer periphery of that same end, axially outward of and adjacent to said first thread; said outer periphery axially outward of said first thread being of larger diameter than said first thread to define a shoulder between said first and second threads, said shoulder abutting against the adjacent end face of the hub body;
    (d) a bearing screwed onto said second screw thread of said cylindrical member; said bearing having at its outer periphery a ball race and at its inner periphery the screw threads in mesh with said second thread;
    (e) an annular driving member rotatably supported between said axially inner ball race of the cylindrical member and said ball race of the bearing, through balls on said races; said driving member having at its outer periphery one or more sprockets and at axially both sides of its inner periphery, ball races complementary to said ball races of said bearing and cylindrical member;

(f) a unidirectional-rotary transmission between the outer periphery of said cylindrical member and the inner periphery of said annular driving member, located between both said ball races of the driving member, the distance between said ball races of said bearing and the axially inner ball race of said cylindrical member being constant;

(g) a first ball holder having a ball race complementary to the ball race of said hub body and being screwed onto one end of said shaft so as to support rotatably said one end of the hub body through balls therebetween; and (h) a second ball holder having a ball race complementary to the outer ball race of said cylindrical member and being screwed onto the other end of said hub shaft so as to rotatably support the axially outside portion of said cylindrical member through balls therebetween; the distance between said hub body ball race and the ball race on the axial outer surface of the cylindrical member extension always remaining constant when the unit hub is properly assembled.

2. The unit hub for a bicycle as set forth in claim 1, wherein said rotary control opening in said cylindrical member is made not-circular at the inner periphery thereof.

* * * * *